United States Patent
Schmieder et al.

(10) Patent No.: US 8,200,896 B2
(45) Date of Patent: Jun. 12, 2012

(54) INCREASING REMOTE DESKTOP PERFORMANCE WITH VIDEO CACHING

(75) Inventors: Wilhelm R. Schmieder, Snoqualmie, WA (US); Srinivasa R. Neerudu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 12/134,823

(22) Filed: Jun. 6, 2008

(65) Prior Publication Data
US 2009/0307428 A1 Dec. 10, 2009

(51) Int. Cl.
| G06F 12/00 | (2006.01) |
| G06F 13/00 | (2006.01) |
| G06F 13/28 | (2006.01) |
| G06F 15/16 | (2006.01) |
| H04B 1/66 | (2006.01) |
| G06T 1/60 | (2006.01) |

(52) U.S. Cl. ............ 711/113; 711/162; 711/E12.001; 375/240; 345/530; 709/227; 709/230

(58) Field of Classification Search .......... 711/113, 711/162, E12.001; 375/240; 345/530; 709/227, 709/230
See application file for complete search history.

(56) References Cited

U.S. PATENT DOCUMENTS

| 4,717,957 | A * | 1/1988 | Santamaki et al. ...... 375/240.12 |
| 6,331,855 | B1 | 12/2001 | Schauser |
| 7,171,444 | B2 | 1/2007 | Deshpande |
| 7,536,657 | B2 | 5/2009 | Shimizu et al. |
| 7,792,898 | B2 | 9/2010 | Lu et al. |
| 7,895,521 | B2 | 2/2011 | Bhogal et al. |
| 2002/0054044 | A1 | 5/2002 | Lu et al. |
| 2004/0042547 | A1* | 3/2004 | Coleman .................. 375/240.01 |
| 2005/0088447 | A1* | 4/2005 | Hanggie et al. ............... 345/545 |
| 2005/0091571 | A1 | 4/2005 | Leichtling |
| 2006/0069797 | A1 | 3/2006 | Abdo et al. |
| 2006/0082583 | A1* | 4/2006 | Leichtling et al. ............ 345/522 |
| 2006/0087512 | A1 | 4/2006 | Schmieder et al. |
| 2006/0230156 | A1 | 10/2006 | Shappir et al. |
| 2007/0005607 | A1* | 1/2007 | Fukuta et al. .................... 707/10 |
| 2007/0103477 | A1* | 5/2007 | Paquette et al. ............... 345/545 |
| 2007/0106810 | A1* | 5/2007 | Ryman ......................... 709/230 |
| 2007/0192491 | A1 | 8/2007 | Saigo et al. |
| 2007/0220168 | A1 | 9/2007 | Parsons et al. |

OTHER PUBLICATIONS

"Apple Remote Desktop 3 (10 Client)", at <<http://store.apple.com/Apple/WebObjects/ukstore.woa/wa/RSLID?mco=9401CC05&nplm=MA231>>, Apple Inc., 2007, pp. 3.

"Mobile TS V1.0", at <<http://palmloyal.palmgear.com/index.cfm?fuseaction=software.showsoftware&prodid=52506&PartnerREF=&siteid=622>>, Palm Inc., 2007, pp. 3.

(Continued)

*Primary Examiner* — Michael Alsip
(74) *Attorney, Agent, or Firm* — Lee & Hayes, PLLC

(57) ABSTRACT

Described techniques improve remote desktop responsiveness by caching an image of a desktop when the host operating system running on the remote desktop server stores graphics output in video memory. Once cached, a Tile Desktop Manager may prioritize the scanning of regions or tiles of the cached image based data received from the operating system. Once regions or tiles that have changed are detected, the changed tiles are copied from the cached desktop image and transmitted to the remote desktop client. The cached desktop image is refreshed based on a feedback loop.

14 Claims, 6 Drawing Sheets

OTHER PUBLICATIONS

Office Action for U.S. Appl. No. 12/032,592, mailed on May 12, 2011, Wilhelm R. Schmieder, "Mechanism for Increasing Remote Desktop Responsiveness".

"Remote Desktop Protocol (RDP) Features and Performance", at <<http://www.microsoft.com/technet/prodtechnol/Win2KTS/evaluate/featfunc/rdpfperf.mspx>>, Microsoft Corporation, 2007, pp. 7.

Office Action for U.S. Appl. No. 12/032,592, mailed on Oct. 31, 2011, Wilhelm R. Schmieder, "Mechanism for Increasing Remote Desktop Responsiveness", 10 pgs.

Olston, et al., "Best-Effort Cache Synchronization with Source Cooperation", In the Proceedings of the 2002 ACM SIGMOD International Conference on Management of Data, Jun. 2002, pp. 73-84.

* cited by examiner

INCREASING REMOTE DESKTOP PERFORMANCE WITH VIDEO CACHING

BACKGROUND

Remote desktop technologies allow a local user interacting with a local computer to control and view a remote desktop session originating from a remote computer. The local computer is commonly referred to as a remote desktop client computer, or simply a "client computer", while the remote computer is commonly referred to as a remote desktop server computer, or "server computer." A remote desktop client application running on the client computer and a remote desktop server application running on the server computer together facilitate "remoting" a desktop session. The remote desktop client application receives user input, such as keyboard and mouse input, and converts the input into a network-compatible representation to be transmitted to the server computer. The remote desktop server application running on the server computer receives the network-compatible representation of the user input, and converts this representation into actual input messages. The input messages are then sent to the server computer's message queue and processed as if the input was generated at the server computer. Therefore, applications running on the server computer respond to the input as if the input was generated at the server computer.

In addition, applications running on the server computer (as well as the operating system running on the server computer) periodically generate graphics output. In the remote desktop scenario, the server computer's graphics output is not displayed on a monitor or other viewing device attached to the server computer. Instead, the remote desktop server application converts the graphics output to a network-compatible representation and transmits the representation to the client computer. The network-compatible representation is received by the remote desktop client application and displayed to the user on a monitor or other device attached to the client computer. In this way, the graphics output of the server computer is displayed on a monitor attached to the client computer.

Traditionally, screen scraping remote desktop technologies have transmitted data representing the server computer's graphics output by directly copying regions of the server computer's graphics output to the client computer. Typically, regions are only copied if the content of the region has changed since the previous copy was transmitted. A continuing need exists for a technique to increase screen scraping remote desktop performance and responsiveness.

SUMMARY

This document describes techniques to increase remote desktop responsiveness and efficiency. In one embodiment, a first image of a desktop is received. The first image is cached in system memory and refreshed periodically, as directed by a feedback loop. In one embodiment the feedback loop is designed to increase responsiveness while conserving system resources. In one embodiment the feedback loop considers available network bandwidth, available computing resources, and desired responsiveness in determining when to refresh the cached desktop image. The cached image is then transmitted to a remote desktop client.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The following discussion targets techniques to increase remote desktop responsiveness and efficiency. In a non-remote desktop scenario, graphics output of a computer is typically displayed on a monitor attached to the computer. In traditional screen scraping remote desktop systems, a computer's graphics output is read from the graphics output and transmitted to a client computer to be displayed by a monitor attached to the client computer. Some operating systems may store the graphics output in a video memory, instead of system memory. Video memory is generally not accessible by applications, such as a remote desktop server application that does not have or use a display driver. Therefore, in one embodiment, in order for a remote desktop server program to read the graphics output, the operating system may first have to compose an image of the desktop from the graphics output, and copy that image into system memory. Alternatively, some operating systems may store graphics output in system memory, in which case the graphics output is copied from system memory into a cache also stored in system memory. Composing the image of the desktop from the graphics output and copying it to system memory in response to every request to access the graphics output introduces delay into the remote desktop system, causing a poor user experience. Composing the image of the desktop also consumes significant amounts of system resources, and therefore can be detrimental to overall system performance.

In addition, a remote desktop server application commonly only needs access to a small region of the desktop to perform the function of updating the remote desktop client application with changes to the graphics output, but the cost of composing the image of the desktop may be the same whether the remote desktop server application requests a small region from the operating system or the entire screen. In one embodiment, the remote desktop server program requests that the operating system compose a desktop image and copy it into system memory. Subsequently, the remote desktop server program caches the image. The remote desktop server program then uses the cached image to detect changes made to the desktop, and as a source of image data with which to update the client computer.

Figure 1:
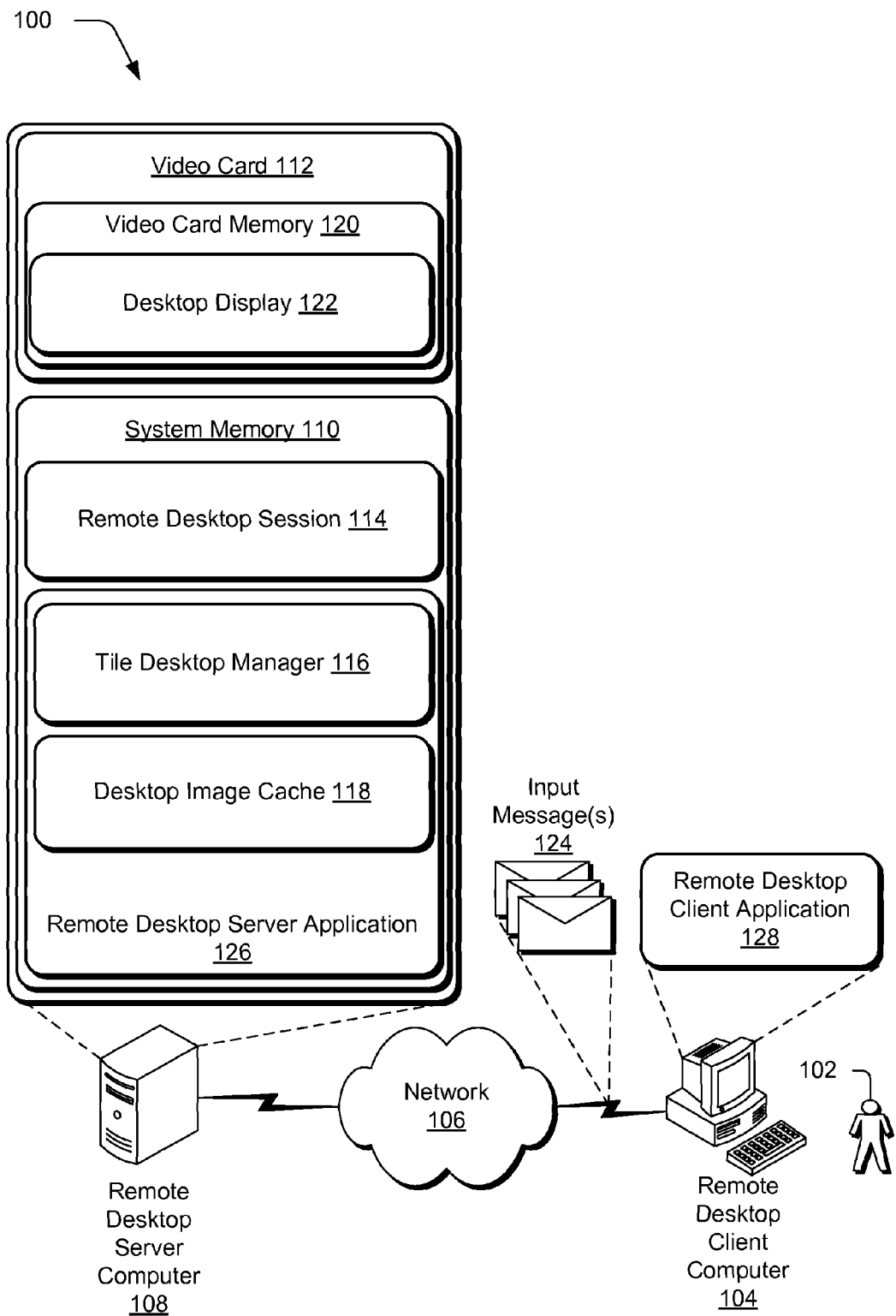
FIG. 1 depicts an illustrative remote desktop environment including a desktop image cache for remote viewing and control of a desktop session running on a server computer.

FIG. 1 depicts an illustrative remote desktop environment 100. The environment 100 includes a user 102 operating a remote desktop client computer 104, which connects to a remote desktop server computer 108 via a network 106. While illustrated as a personal computer (PC), the remote desktop client computer 104 may comprise any device capable of receiving user input, transmitting the user input over the network 106, and displaying data representing a remote desktop display 122. Illustrative examples are a desktop, server, or laptop computer, a cell-phone, a Personal Digital Assistant (PDA), or a thin client or set-top box, among others. The network 106 may be a Local Area Network (LAN), the internet, an infra-red network, a cellular network, or an 802.11 wireless network, among others. While illustrated as a server, the remote desktop server computer 108 may be a server, desktop, or laptop computer. Additionally, the remote desktop server computer 108 may be a virtualized computer running side-by-side with other virtualized computers on the same terminal server or virtual machine. The remote desktop server computer 108 may be capable of executing multiple instances of a remote desktop session 114.

The remote desktop client computer 104 executes a remote desktop client application 128. Typically, the remote desktop client application 128 is initiated by the user 102, although in some embodiments the remote desktop client computer 104 comprises a terminal or thin-client computer, wherein the remote desktop client application 128 is executing without user 102 having initiated it.

The remote desktop server computer 108 includes a system memory 110. The system memory 110 may comprise DRAM, or Dynamic Random Access Memory, although the system memory 110 may comprise DRAM additionally augmented with virtual memory such as a hard disk drive. The remote desktop server computer 108 loads a remote desktop server application 126 into the system memory 110. In one embodiment, the remote desktop server application 126 comprises a Microsoft® Terminal Server application. In response to a request for a new remote desktop session, the remote desktop server application 126 causes a remote desktop session 114 to be loaded into the system memory 110. The remote desktop session 114 comprises a context in which a user may execute applications. The remote desktop session 114 may comprise an operating system shell, such as Microsoft Windows® explorer. An operating system shell provides the user 102 with a means of interacting with the computer, such as a desktop, a Start Menu, and mouse and keyboard access. Once a remote desktop session 114 is created, and connection between the remote desktop client application 128 and the remote desktop server application 126 is established, the user 102 may launch computer applications stored on the remote desktop server computer 108. These applications will run in the context of the remote desktop session 114.

The remote desktop server computer 108 also may include a video card 112. The video card 112 may be integrated into a motherboard or processor of the Remote desktop server computer 108, or the video card 112 may be an add-on card plugged into the motherboard. The video card 112 receives as input graphics instructions, such as GDI (Graphics Device Interface), DirectX, or OpenGL instructions. The video card 112 processes these instructions to generate graphics output.

Traditionally, graphics output is displayed on a monitor directly connected to the video card 112, but in the context of a remote desktop environment 100 the graphics output is stored in the system memory 110 or a video card memory 120. Graphics instructions generated by applications running in the context of the remote desktop session 114 may be stored in a desktop display 122 located in a video card memory 120. The video card memory 120 may comprise DRAM located on the video card 112, or may comprise a portion of the system memory 110.

In some embodiments, the user 102 controls applications running within the Remote desktop session 114. In one embodiment, the remote desktop client computer 104 receives the one or more input messages 124 as a result of the user 102 operating input devices such as a keyboard and mouse. The user 102 creates the one or more input messages 124 to control the applications running in the Remote desktop session 114. The remote desktop client application 128 transmits data representing the one or more input messages 124 to the Remote desktop server computer 108. In one embodiment, the Remote desktop server computer 108 sends the data representing the one or more input messages 124 to the Remote Desktop Server Application 126. The Remote Desktop Server Application 126 transforms the data representing the input messages 124 into traditional input messages, and sends the traditional input messages to the Remote desktop session 114. The Remote desktop session 114 then sends the traditional user input messages to the appropriate application running in the Remote desktop session 114.

In one embodiment, data the graphics output generated by applications running in the Remote desktop session 114 is transmitted over the Network 106 to the remote desktop client application 128 for display to the user 102. In one embodiment the graphics output generated by the application programs executing in the Remote desktop session 114 are output to desktop display 122.

A desktop image cache 118 may invoke the operating system to copy the graphics output stored in the desktop display 122 to the system memory 110. Subsequently, a tile desktop manager 116 may transmit regions of the cached graphics output to the remote desktop client application 128. Other embodiments are described below.

In order to efficiently update the remote desktop client application 128 with the graphics output stored in the desktop display 122, the Remote Desktop Server Application 126 only transmits data representing regions of the desktop display 122 that have changed since the last transmittal. The Remote Desktop Server Application 126 invokes the tile desktop manager 116 to detect changes to the graphics output stored in the desktop display 122.

In order to detect changes to the desktop display 122, the tile desktop manager 116 may access the graphics output of the Remote desktop session 114. Traditionally, the desktop display 122 was stored in system memory, and was therefore accessible directly by the tile desktop manager 116. However, in one embodiment, the desktop display 122 is located in the video card memory 120 of the video card 112. In this embodiment, before the tile desktop manager 116 may scan for changes in the desktop display 122, a copy of the desktop display 122 must be made in the system memory 110. Because applications such as the remote desktop server application 126 do not have direct access to the video card memory 120, the desktop image cache 118 must invoke the operating system to compose a desktop image from the graphics output stored in the desktop display 122. The desktop image cache 118 caches this composed image in the system memory 110. Once this cached copy has been made, the tile desktop manager 116 may directly and efficiently access the image. It is also contemplated that the graphics output of the desktop display 122 being cached is retrieved from the system memory 110 or any other repository of graphics output.

The tile desktop manager 116 scans for changes to the desktop image by breaking the desktop image into regions or tiles. By subdividing the desktop image, changes can be detected with less computational effort and, once identified, region(s) containing the changes can be transmitted to the remote desktop client application 128 using less bandwidth than if the entire desktop image were transmitted. Once the desktop image is subdivided, the tile desktop manager 116 may scan one region at a time looking for changes. As changes to the graphics output are identified, data representing the updated regions of the graphics output may be sent to the remote desktop client application 128.

In one embodiment, the desktop image cache 118 caches a desktop image of the desktop display 122 in the system memory 110. The tile desktop manager 116 may then access regions of the desktop image stored in the desktop image cache 118 to check for changes to the regions. The desktop image cache 118 may refresh the cached image of the desktop display 122 frequently enough to ensure the image is current, but not so frequently as to unnecessarily degrade performance. For example, the desktop image cache 118 may be refreshed eight times a second, providing a responsiveness to user input within the acceptable range of 300 to 700 milliseconds. In one embodiment, the cost in time and computing power to refresh the entire cached desktop image is equal to the cost in time and computing power to refresh a single region of the desktop image. Therefore, by caching an image of the desktop display 122, the desktop image cache 118 significantly improves responsiveness by reducing the number of times the operating system must refresh the desktop image.

Figure 2:
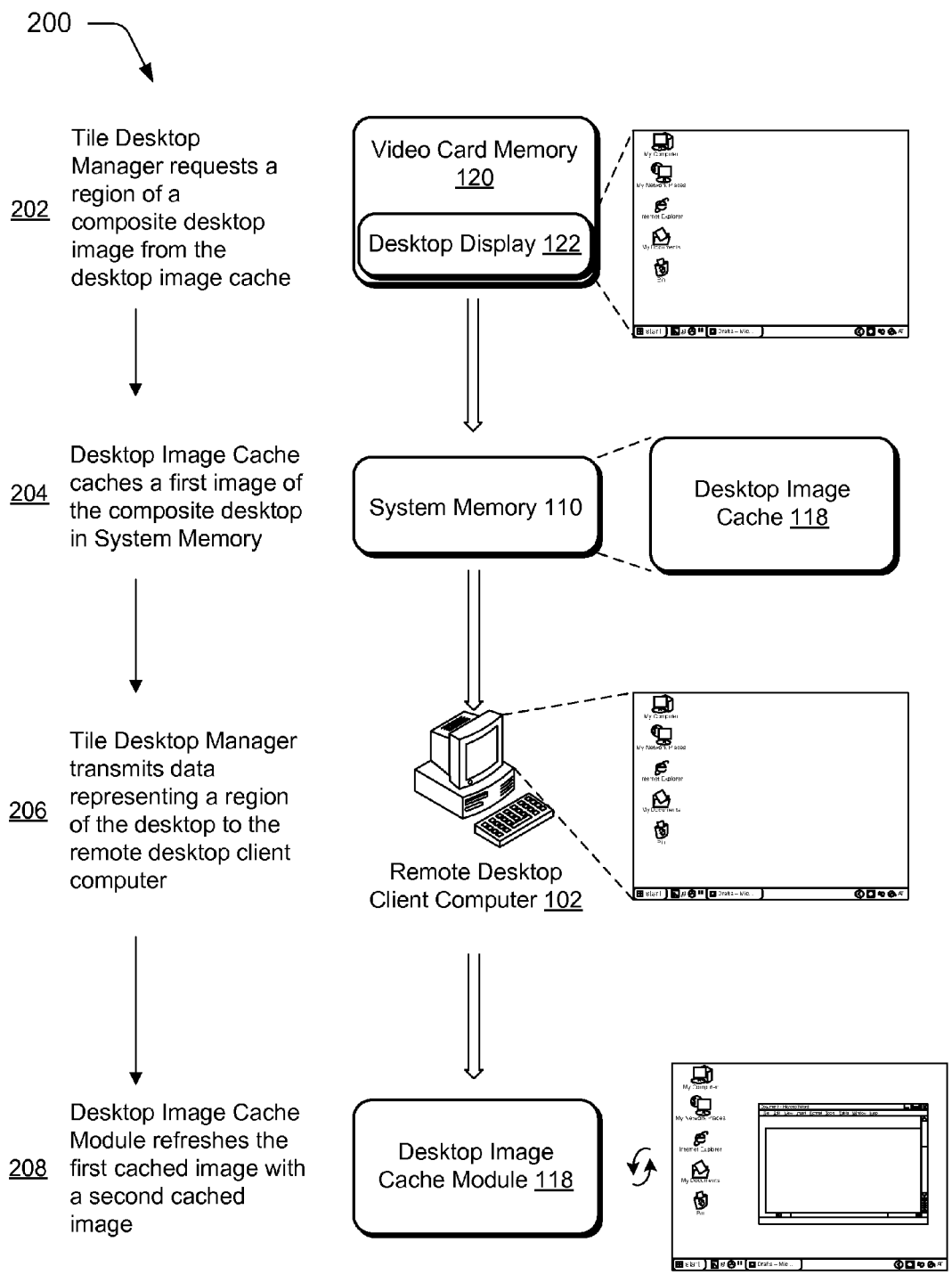
FIG. 2 depicts an illustrative process for caching a composite desktop image and transmitting data representing that image to a client computer.
Figure 3:
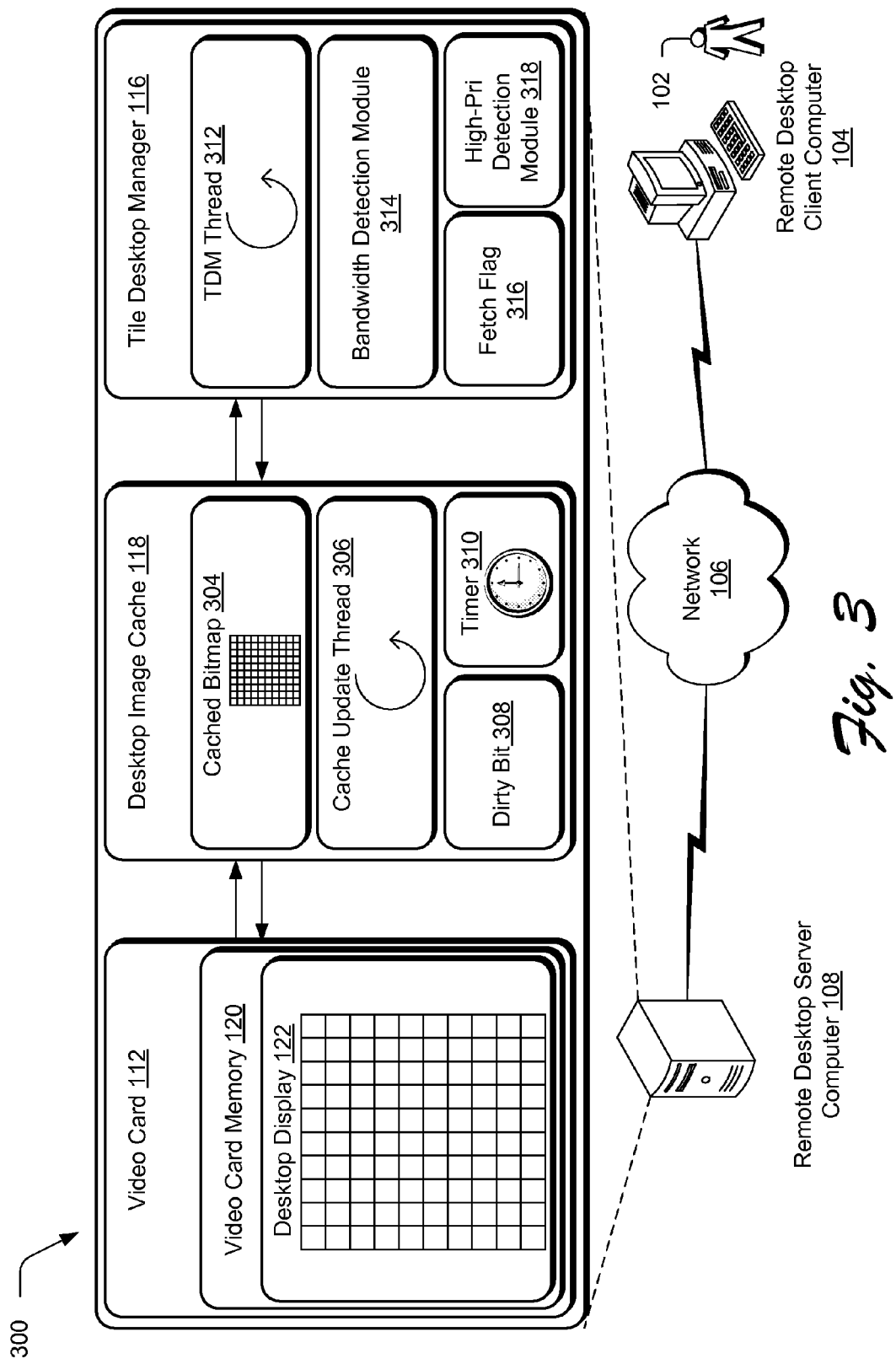
FIG. 3 depicts illustrative components of the illustrative environment of FIG. 1 for controlling the cache of the server computer's graphics output with a feedback loop.

FIG. 2 depicts an illustrative process 200 for caching a composite desktop image and transmitting data representing that image to a client computer. Process 200, as well as other processes described throughout, represents a sequence of operations that can be implemented in hardware, software, or a combination thereof. In the context of software, the blocks represent computer instructions that, when executed by one or more processors, perform the recited operations. Although process 200 is described with reference to the Remote desktop server computer 108, process 200 is applicable to any type of computing device.

At operation 202, the tile desktop manager 116 requests a region of a composite desktop image from the desktop image cache 118. The desktop image cache 118 invokes the operating system to generate a composite desktop image from the desktop display 122. To compose the desktop image, the operating system requests that each application render itself, the operating system overlaying the renderings according to relative z-axis ordering, resulting in a snapshot of the entire desktop. At operation 204 the desktop image cache 118 caches a copy of the composite desktop image in the system memory 110. By caching a copy of the composite desktop image, existing techniques of scanning the composite desktop output, including a region by region scan, may be accomplished without refreshing the composite desktop image for each region scanned. Requests made to the operating system to retrieve regions of the desktop display 122 may be costly, and take on the order of hundreds of milliseconds to complete. If, for example, the desktop display 122 is broken down into 256 regions, twenty of which were checked for changes in a given frame, two seconds could elapse while searching for changes, rendering the remote desktop environment unusable. At operation 206 the Tile Desktop Manager transmits data representing a region of the desktop to the remote desktop client computer 102. At an operation 208 the desktop image cache 118 then refreshes the cached image of the composite desktop. The desktop cache module 118 determines when to refresh the cache by considering the amount of system resources available on the remote desktop server computer, the amount of system resources the server administrator has determined will be devoted to the remote desktop environment, and the desired level of remote desktop responsiveness, among others.

Also depicted is an illustrative remote desktop environment 300, comprising portions of the illustrative remote desktop environment 100 in greater detail. As previously discussed in the environment 100, the environment 300 includes the user 102 operating the remote desktop client computer 104, which connects to the remote desktop server computer 108 via the network 106. The Remote desktop server computer 108 includes the video card 112, the tile desktop manager 116, and the desktop image cache 118. The video card 112 includes the video card memory 120, which includes the desktop display 122.

The desktop image cache 118 includes a cached bitmap 304. Importantly, the cached bitmap 304 is stored in the system memory 110, allowing software components such as the tile desktop manager 116 to efficiently access the contents of the cached bitmap 304. In one embodiment the cached bitmap is segmented into regions, either physically or logically, allowing the tile desktop manager 116 to access portions of the cached bitmap. The cached bitmap 304 may be regularly updated with a snapshot image of the desktop display 122, allowing the tile desktop manager 116 to efficiently and iteratively access regions of the cached desktop image stored in the cached bitmap 304.

In one embodiment, the tile desktop manager 116 and the desktop image cache 118 work together to efficiently access the contents of the desktop display 122. The tile desktop manager sends and receives network communications with the remote desktop client computer 104, as well as processes the desktop images stored in the cached bitmap 304 to detect changes. Meanwhile, the desktop image cache 118 must wait for the operating system to finish the potentially time-consuming operation extracting a composite desktop image from the video card memory 120. Because both the tile desktop manager 116 and the desktop image cache 118 must wait on external components for indefinite periods of time, and because often it would be advantageous for both components to be executing simultaneously, it would be inefficient for the tile desktop manager 116 and the desktop image cache 118 to be executed by the same thread of execution. Therefore, the desktop image cache 118 additionally includes a cache update thread 306, while the tile desktop manager 116 includes a Tile Desktop Manager (TMD) thread 312. Each module is typically executed by its respective thread, allowing concurrent execution.

In one embodiment, the tile desktop manager 116 may use a device context to access the desktop image. A device context is an abstraction of a graphics display. In a traditional remote desktop environment, the tile desktop manager may access a desktop display stored by the operating system in the system memory 110 via a device context provided by the operating system. In one embodiment, when the operating system stores the graphics output of the Remote desktop server computer 108 in the video card memory 120, the desktop image cache 118 that presents the cached bitmap 304 to the tile desktop manager 116 may comprise a device context. Therefore, regardless of where the operating system stores the graphics output, the tile desktop manager 116 retrieves regions of the desktop image from a device context.

In one embodiment, the desktop image cache 118 refreshes the cached bitmap 304 as fast as possible. This embodiment will provide the tile desktop manager 116 with the most up-to-date desktop image from the desktop display 122 as possible. However, this method of refreshing the cached bitmap 304 may degrade overall system performance, and result in a net loss of user responsiveness. In one scenario, too many system resources may be devoted to providing an up to date copy of a composite desktop image, such that not enough system resources remain to scan the composite desktop images while maintaining responsiveness.

Therefore, in one embodiment, information from the desktop image cache 118 and the tile desktop manager 116 is used by a feed-back loop to determine when the desktop image cache 118 should refresh the cached bitmap 304.

In one embodiment the cached bitmap 304 may be refreshed when the tile desktop manager 116 knows it will not request a region from the desktop image cache 118 in the immediate future, or if the tile desktop manager 116 knows it has scanned a last region in a series of regions. The tile desktop manager requests that the cached bitmap 304 be refreshed in these situations because the time required to perform the refresh will not cause responsiveness to suffer, as there are no regions on hand to be scanned for changes. By knowing when it will not immediately request a region of the cached bitmap 304, the tile desktop manager can notify the desktop image cache 118 that the cached bitmap 304 should be refreshed immediately. If instead the desktop image cache 118 waited for the next request to refresh, a delay would occur as the cached bitmap 304 was refreshed while a request was pending.

In one embodiment, a bandwidth detection module 314 may determine when the Network 106 has available bandwidth and/or when the network 106 does not have available bandwidth. When the Network 106 does not have available bandwidth, it may not be possible to transmit data representing a region to the remote desktop client computer 104, even if the tile desktop manager 116 has identified regions of the cached bitmap 304 that have changed since the last transmission. The bandwidth detection module 314 then notifies the tile desktop manager 116 that no bandwidth is available, and for the reasons described above for refreshing the cached bitmap 304 when the tile desktop manager 116 will not immediately request access to a region, the tile desktop manager 116 may communicate this indication to the desktop image cache 118.

In one embodiment, the tile desktop manager 116 sets a fetch flag 316 in response to an indication from the bandwidth detection module 314 that no network bandwidth is available. To set the fetch flag 316, the tile desktop manager 116 sets the flag to '1' or 'true'. Once the fetch flag 316 is set, the next call made by the tile desktop manager 116 to the desktop image cache 118 may cause the desktop image cache 118 to set a dirty bit 308.

Setting the dirty bit 308 (assigning a value of '1' or 'true' to the bit) indicates that the desktop image cache 118 should refresh the cached bitmap 304. Once the dirty bit 308 is set, the cache update thread 306 will refresh the cached bitmap 304 with an updated copy of the desktop display 122. Updating the cached bitmap 304 while there is no network bandwidth available is opportunistic for the reasons given above—the relatively slow refresh operation occurs when updates could not otherwise be transmitted, so there may be no loss of responsiveness due to waiting on the refresh.

The tile desktop manager 116 may additionally set the fetch flag 316 based on other conditions. For example, in one embodiment the tile desktop manager 116 may scan the cached bitmap 304 region by region for changes that have been made to the cached bitmap 304. By prioritizing the order in which the regions are scanned based on the likelihood of finding a change in a particular region, the tile desktop manager 116 may detect changes more efficiently. In this embodiment, the tile desktop manager may seek to balance the thoroughness of a scan of the cached bitmap 304 with the rate at which the cached bitmap 304 is refreshed. One way of balancing thoroughness of a scan with the refresh rate of a scan is to only scan certain high-priority regions. In this case, the fetch flag 316 may be set when all high priority regions have been scanned, lessening the time between refreshes of the cached bitmap 304. In one embodiment, once the fetch flag 316 is set, the next call made to the desktop image cache 118 will set the dirty bit 308, causing a refresh of the entire cached bitmap 304.

In another embodiment, the tile desktop manager 116 may know that it has transmitted data representing the last in a series of regions to the remote desktop client computer 104. Knowing the last region has been transmitted, the tile desktop manager 116 infers that it will not request another region from the cached bitmap 304 immediately. In this case, the tile desktop manager 116 may call the desktop image cache 118, which will set the dirty bit 308, causing the cached bitmap 304 to be completely refreshed as described above. Alternatively, the tile desktop manager 116 may set the fetch flag fetch flag 116 as described above.

In one embodiment, a high priority detection module 318 detects when a region of the cached bitmap 304 has a high priority. When a high priority region is detected, the tile desktop manager 116 may request the desktop image cache 118 to immediately refresh the cached bitmap 304 before returning the high priority region to the remote desktop client application 128, thus ensuring that the most up to date graphics output is obtained. Examples of a high priority region are regions of the remote desktop session 114 that contain a mouse cursor, a caret, or other data indicating there exists a higher than average likelihood that a region of the cached bitmap 304 has changed. In some embodiments, the locations of the mouse cursor and the caret that are considered in calculating whether a region is a high priority or not are the locations according to the remote desktop session 114. In some embodiments, the location of the mouse cursor as currently displayed on the remote desktop client computer 104 is considered. These locations differ because the location of the mouse cursor in the remote desktop session 114 inherently lags behind the position of the mouse cursor on the remote desktop client computer 104. In addition to cursor and caret location, data such as the current active window and the current active control may also be considered in determining the priority of a region.

In one embodiment, the timer 310 may periodically trigger the cache update thread 306 to refresh the cached bitmap 304. This update ensures that the cached bitmap 304 does not become stale in the absence of any other refresh trigger. For instance, if network bandwidth becomes unavailable, the remote desktop session 114 will continue to execute applications, which will continue to update the desktop display 122. Failing to keep an up to date cache of the composite desktop image may result in unnecessary lag when the network bandwidth becomes available and the cached bitmap 304 must be refreshed. In order to reduce the differences between the desktop display 122 and the cached bitmap 304 absent the above mentioned criteria, the timer 310 will regularly and periodically cause the cached bitmap 304 to refresh.

Taken together, the criteria described above that controls the refresh rate of the cached bitmap 304 comprises a feedback-loop. Additionally, administrator customizable criteria and user customizable criteria may adjust the feedback-loop. Example criteria include the percentage of processing time devoted to remote desktop server processing, the percentage of processing time allowed to a single remote desktop session 114, and the desired average effective refresh rate.

Figure 4:
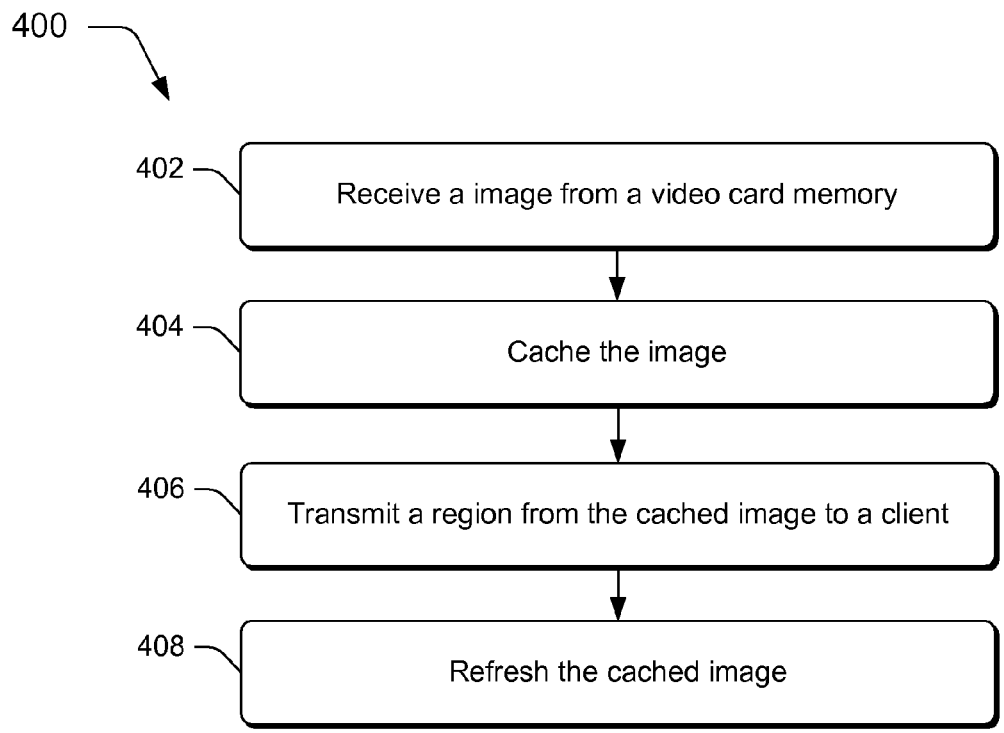
FIG. 4 depicts an illustrative process for receiving, caching, and transmitting a desktop image to a remote desktop client.

FIG. 4 depicts an illustrative process for receiving, caching, and transmitting a desktop image to a remote desktop client. Operation 402 represents receiving a desktop image from the video card memory 120. Operation 404, meanwhile, represents caching the received desktop image. As described above, the tile desktop manager 116 may operate on this cached desktop image. Operation 406 represents transmitting a region from the cached desktop image to the remote desktop client computer 102. Finally, operation 408 represents refreshing the cached desktop image from the video card memory 120.

Figure 5:
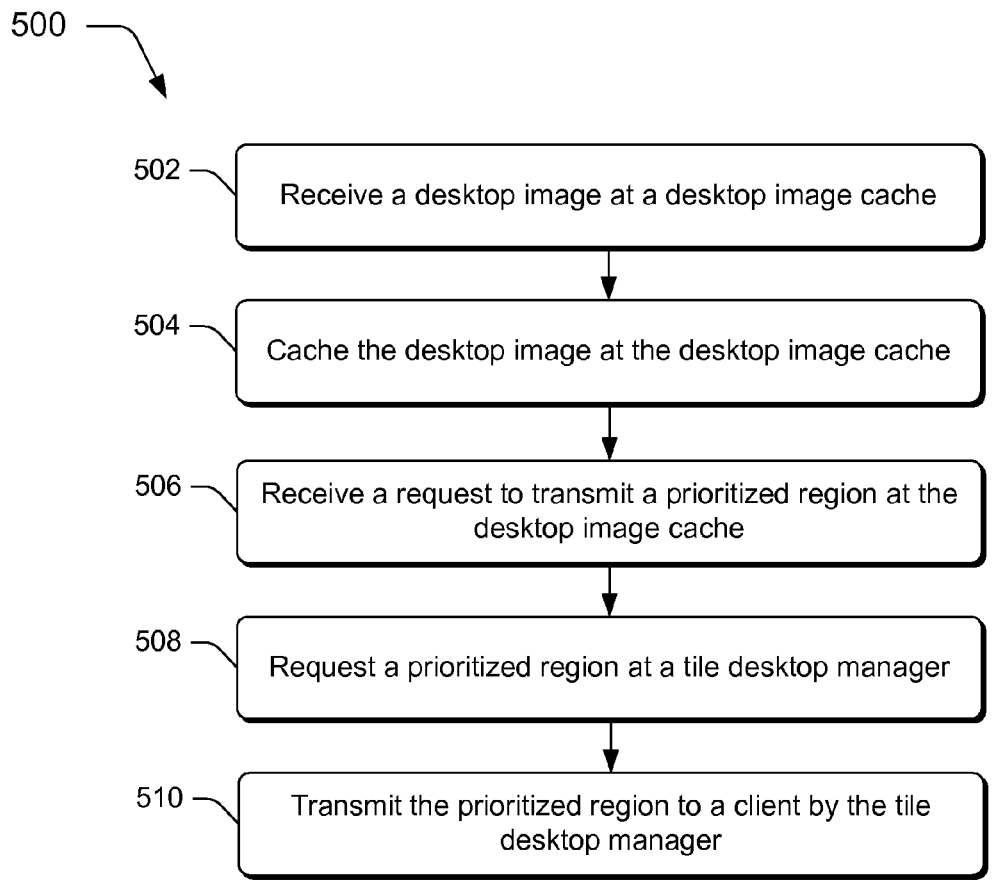
FIG. 5 depicts an illustrative process for receiving and caching a desktop image, such that a request to transmit a prioritized region of the desktop image is transmitted from the cached desktop image.

FIG. 5 depicts an illustrative process for receiving and caching a desktop image, such that a request to transmit a prioritized region of the desktop image is transmitted from the cached desktop image. Operation 502 represents receiving a desktop image into the desktop image cache 118. Operation 504, meanwhile, represents caching the received desktop image in the desktop image cache 118. Operation 506 represents receiving a request at the desktop image cache 118 to transmit a prioritized region of the cached desktop image. Operation 508 represents requesting by the tile desktop manager 116 a prioritized region of the desktop image. Finally, operation 510 represents transmitting the prioritized region by the tile desktop manager 116 to the remote desktop client computer 102.

Figure 6:
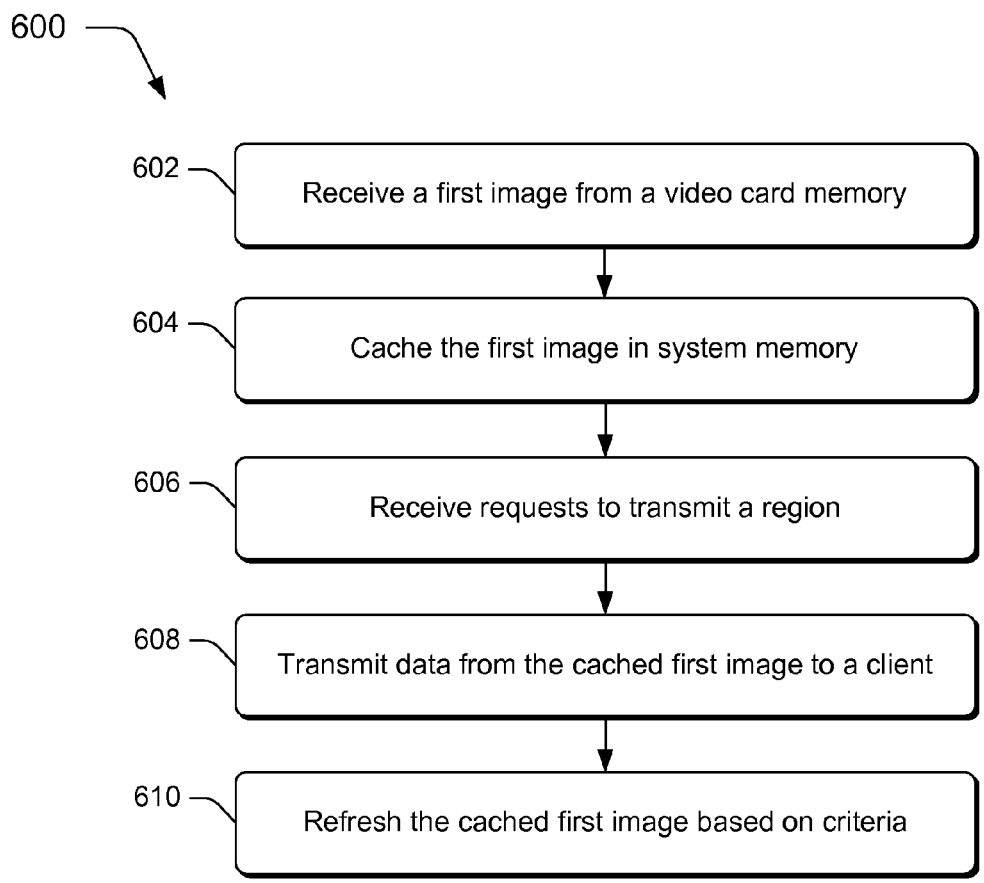
FIG. 6 depicts an illustrative process for receiving and caching a desktop image from a video card memory, such that a region of the desktop image is transmitted to a client, and the cached desktop image is refreshed based on a set of criteria.

FIG. 6 depicts an illustrative process for receiving and caching a desktop image from a video card memory, such that a region of the desktop image is transmitted to a client, and the cached desktop image is refreshed based on a set of criteria. Operation 602 represents receiving a first desktop image from the video card memory 120. Operation 604, meanwhile, represents caching the first desktop image in the cached bitmap 304. Operation 606 represents receiving one or more requests to transmit a region of the cached bitmap 304. Operation 608 represents transmitting data from the cached first desktop image in the cached bitmap 304 to the remote desktop client computer 104. Finally, operation 610 represents refreshing the cached first desktop image stored in the cached bitmap 304 based on a number of criteria described above, such as availability of remote desktop server computer 108 resources, and desired responsiveness. These criteria, and the mechanisms used to enforce them, create a feed-back loop that determines when the cached bitmap 304 should be refreshed.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
receiving a first image of a desktop display from a video card memory;
caching the first image of the desktop display in a system memory of a remote desktop server computer;
transmitting, using a tile desktop manager of the remote desktop server computer, one or more regions of the first image of the desktop display to a remote desktop client application;
determining that a last region of the one or more regions of the first image of the desktop display has been transmitted to the remote desktop client application and that an available bandwidth of a network for data transmission is limited;
setting a fetch flag in response to the determining, the fetch flag instructing a desktop image cache to refresh the first image of the desktop display in the system memory based at least in part on a determination that the tile desktop manager will not make a request to transmit updated regions of the desktop display to the remote desktop client application;
receiving, based on the set fetch flag, a second image of the desktop display from the video card memory;
splitting the second image of the desktop display into regions;
scanning high priority regions of the second image of the desktop display for changes with respect to the first image in the system memory;
refreshing, based at least in part on system resource availability, the cached first image of the desktop display in the system memory with one or more of the high priority regions of the second image of the desktop display that have changed; and
transmitting the one or more changed high priority regions to the remote desktop client application when there is sufficient network bandwidth.

2. A method as described in claim 1, wherein refreshing the cached first image of the desktop display with the one or more changed high priority regions of the second image of the desktop display further occurs according to a predefined periodic schedule.

3. A method as described in claim 2, wherein the predefined periodic schedule is within a range of 100 milliseconds to 700 milliseconds.

4. A method as described in claim 1, wherein the high priority regions are tiles associated with a mouse cursor or a caret.

5. A method as described in claim 1, wherein the first and second image of the desktop display comprise a composite image generated in a video memory.

6. A method as described in claim 1, wherein the tile desktop manager only scans the high priority regions.

7. A method as described in claim 1, further comprising:
receiving a plurality of requests to transmit individual regions of the cached first image of the desktop display.

8. A method as described in claim 1, further comprising:
receiving a request to transmit the one or more changed high priority regions of the second image of the desktop display when the sufficient network bandwidth becomes available.

9. A computer system comprising:
one or more processors;
memory, accessible by the one or more processors;
a desktop image cache stored in the memory and executable on the one or more processors to receive a composite desktop image, cache the composite desktop image, and receive a request to transmit one or more prioritized regions of the composite desktop image to a remote desktop client application;

a bandwidth detection module that determines available bandwidth of a network;

a tile desktop manager stored in the memory and executable on the one or more processors to:

set a fetch flag in response to the bandwidth detection module determining that there is insufficient bandwidth for data transmission, the fetch flag instructing the desktop image cache to refresh the composite desktop image based at least in part on a determination that the tile desktop manager will not issue a new request to transmit portions of the composite desktop image to the remote desktop client application;

receive, based on the set fetch flag, an updated composite desktop image;

split the updated composite desktop image into multiple regions;

scan the multiple regions of the updated composite desktop image for changes with respect to the composite desktop image; and initiate the request to transmit the one or more prioritized regions;

wherein the desktop image cache refreshes at least the one or more prioritized regions of the composite desktop image with the changes resulting from the scanning of the updated composite desktop image prior to the tile desktop manager initiating the request.

10. A computer system as recited in claim 9, wherein the desktop image cache refreshes the one or more prioritized regions, in part, in response to an event timer that periodically signals within a range of 100-700 milliseconds.

11. A computer system as recited in claim 9, wherein the one or more prioritized regions correspond to a mouse cursor or a caret.

12. A computer system as recited in claim 9, wherein the desktop image cache refreshes the one or more prioritized regions when resources of the one or more processors or the memory are below a customizable threshold.

13. A computer system as recited in claim 9, wherein the tile desktop manager only scans the one or more prioritized regions.

14. One or more computer device memories comprising computer-executable instructions that, when executed on one or more processors, perform acts comprising:

receiving a first image of a desktop display from a video card memory;

caching the first image in a system memory;

receiving a request to transmit one or more regions of the cached first image;

transmitting data representing the one or more regions of the cached first image to a remote desktop client application;

determining that a last region of the one or more regions of the cached first image has been transmitted to the remote desktop client application and that a threshold amount of network bandwidth for data transmission is not available;

setting a fetch flag in response to determining the transmission of the last region and that the threshold amount of network bandwidth is not available, the fetch flag instructing a desktop image cache to update the first image based at least in part on a determination that a request from a tile desktop manager to transmit updated regions of the desktop display to the remote desktop client application is not expected during a threshold period of time;

receiving, based on the set fetch flag, an updated image of the desktop display from the video card memory;

scanning regions of the updated image of the desktop display for changes with respect to the first image in the system memory;

refreshing the cached first image with updated data corresponding to one or more changed high priority regions in the updated image; and transmitting the updated data to the remote desktop client application when the threshold amount of network bandwidth is available.

* * * * *